United States Patent
Babaee et al.

(10) Patent No.: US 12,301,267 B2
(45) Date of Patent: May 13, 2025

(54) APPARATUSES AND METHODS FOR FACILITATING JOINT PRECODING AND PROBABILISTIC CONSTELLATION SHAPING

(71) Applicant: CIENA CORPORATION, Hanover, MD (US)

(72) Inventors: Ramin Babaee, Ottawa (CA); Shahab Oveis Gharan, Ottawa (CA); Martin Bouchard, Cantley (CA)

(73) Assignee: CIENA CORPORATION, Hanover, MD (US)

( * ) Notice: Subject to any disclaimer, the term of this patent is extended or adjusted under 35 U.S.C. 154(b) by 33 days.

(21) Appl. No.: 18/345,004

(22) Filed: Jun. 30, 2023

(65) Prior Publication Data
US 2025/0007543 A1   Jan. 2, 2025

(51) Int. Cl.
*H04B 1/04* (2006.01)
*H04L 27/00* (2006.01)
*H04L 27/04* (2006.01)

(52) U.S. Cl.
CPC ....... *H04B 1/0475* (2013.01); *H04L 27/0012* (2013.01); *H04L 27/04* (2013.01)

(58) Field of Classification Search
CPC ... H04L 27/3411; H04L 27/36; H04L 1/0042; H04L 25/4975; H04L 1/0041;
(Continued)

(56) References Cited

U.S. PATENT DOCUMENTS

RE30,182 E  * 12/1979  Howson ................ H04L 25/497
                                                         375/259
2004/0085939 A1 * 5/2004  Wallace ................ H04W 52/50
                                                         370/335
(Continued)

FOREIGN PATENT DOCUMENTS

WO    WO-2016131484 A1 *  8/2016  ........... H04B 7/0456

OTHER PUBLICATIONS

Amari, A. , et al., "Introducing enumerative sphere shaping for optical communication systems with short blocklengths", J. Lightw. Technol., vol. 37, No. 23, pp. 5926-5936, 2019.
(Continued)

*Primary Examiner* — Sophia Vlahos
(74) *Attorney, Agent, or Firm* — Guntin & Gust, PLC; Mark Wilinski

(57) ABSTRACT

Aspects of the subject disclosure may include, for example, identifying a modulation scheme for transmitting data from a transmitter to a receiver, identifying a plurality of symbols associated with the modulation scheme, determining that a transfer function of a filter that is applied at the transmitter imposes an interdependence amongst at least two symbols of the plurality of symbols, determining, based on the transfer function, a joint probability distribution of the plurality of symbols that reduces a signal power of at least one signal that is used to transmit the data subject to a constraint that an information rate associated with the at least one signal is greater than a threshold, and causing the data to be transmitted via the at least one signal from the transmitter to the receiver in accordance with the joint probability distribution. Other aspects are disclosed.

20 Claims, 15 Drawing Sheets

(58) Field of Classification Search
CPC ........... H04L 25/03006; H04L 27/2614; H04L 27/04; H04B 1/0475
See application file for complete search history.

(56) References Cited

U.S. PATENT DOCUMENTS

| | | | | |
|---|---|---|---|---|
| 2007/0109954 A1* | 5/2007 | Pasanen | ................ | H04L 1/0618 370/204 |
| 2010/0061479 A1* | 3/2010 | Mazet | ................ | H04L 27/3488 375/295 |
| 2017/0170993 A1* | 6/2017 | Jia | .................... | H04L 25/03006 |

OTHER PUBLICATIONS

Barsoum, M.F., et al., "Constellation design via capacity maximization", Proc. IEEE Int. Symp. Inf. Theory, Jun. 2007, pp. 1821-1825.

Batshon, H.G., et al., "Coded modulation based on 56APSK with hybrid shaping for high spectral efficiency transmission", Proc. Eur. Conf. Opt. Commun. (ECOC), Sep. 2017, pp. 1-3.

Baur, S., et al., "Arithmetic distribution matching", Proc. Int. ITG Conf. Syst. Commun. Coding, Feb. 2015, pp. 1-6.

Boyd, S., et al., "Convex optimization", Cambridge university press, 2004.

Cai, Jin-Xing, et al., "51.5 Tb/s capacity over 17,107 km in C+L bandwidth using single-mode fibers and nonlinearity compensation", J. Lightw. Technol., vol. 36, No. 11, pp. 2135-2141, 2018.

Cai, Jin-Xing, et al., "70.46 Tb/s over 7,600 km and 71.65 Tb/s over 6,970 km transmission in C+L band using coded modulation with hybrid constellation shaping and nonlinearity compensation", J. Lightw. Technol., vol. 36, No. 1, pp. 114-121, 2018.

Calderbank, A.R., et al., "Nonequiprobable signaling on the gaussian channel", IEEE Trans. Inf. Theory, vol. 36, No. 4, pp. 726-740, 1990.

Chen, Yizhao, et al., "On optimization and analysis of enumerative sphere shaping for short blocklengths", J. Lightw. Technol., vol. 40, No. 22, pp. 7265-7278, 2022.

Cover, Thomas, et al., "Elements of Information Theory", 2nd ed. John Wiley & Sons, Inc., Part 1 of 2, 563 pages total, 2006.

Cover, Thomas, et al., "Elements of Information Theory", 2nd ed. John Wiley & Sons, Inc., Part 2 of 2, 2006.

Duda, Richard O, et al., "Pattern Classification", 2nd ed. New York: John Wiley & Sons, Inc., Part 1 of 3, 744 pages total, 2001.

Duda, Richard O, et al., "Pattern Classification", 2nd ed. New York: John Wiley & Sons, Inc., Part 2 of 3, 2001.

Duda, Richard O, et al., "Pattern Classification", 2nd ed. New York: John Wiley & Sons, Inc., Part 3 of 3, 2001.

Fehenberger, T., et al., "Multisetpartition distribution matching", IEEE Trans. Commun., vol. 67, No. 3, pp. 1885-1893, 2019.

Fischer, R.F.H., "Precoding and Signal Shaping for Digital Transmission", John Wiley & Sons, 2002.

Forney, Jr., David G., et al., "Efficient modulation for band-limited channels", IEEE J. Sel. Areas Commun., vol. 2, No. 5, pp. 632-647, 1984.

Foschini, G., et al., "Optimization of two-dimensional signal constellations in the presence of gaussian noise", IEEE Trans. Commun., vol. 22, No. 1, pp. 28-38, 1974.

Fragouli, C., et al., "Turbo codes with non-uniform constellations", Proc. IEEE Int. Conf. Commun. (ICC), Conf. Rec., vol. 1, Jun. 2001, pp. 70-73.

Gultekin, Y.C., et al., "Approximate enumerative sphere shaping", Proc. IEEE Int. Symp. Inf. Theory (ISIT), Jun. 2018, pp. 676-680.

Gultekin, Y.C., et al., "Enumerative sphere shaping for wireless communications with short packets", IEEE Trans. Wireless Commun., vol. 19, No. 2, pp. 1098-1112, 2020.

Kayhan, F., et al., "Constellation design for memoryless phase noise channels", IEEE Trans. Wireless Commun., vol. 13, No. 5, pp. 2874-2883, 2014.

Laroia, R., et al., "On optimal shaping of multidimensional constellations", IEEE Trans. Inf. Theory, vol. 40, No. 4, pp. 1044-1056, 1994.

Schulte, P., et al., "Divergence-optimal fixed-to-fixed length distribution matching with shell mapping", IEEE Wireless Commun. Lett., vol. 8, No. 2, pp. 620-623, 2019.

Schutle, Patrick, et al., "Constant composition distribution matching", IEEE Trans. Inf. Theory, vol. 62, No. 1, pp. 430-434, 2016.

Shannon, C.E., "A mathematical theory of communication", Bell Syst. Tech. J, vol. 27, No. 3, pp. 379-423, 1948.

Shannon, C., "Communication in the presence of noise", Proc. IRE, vol. 37, No. 1, pp. 10-21, 1949.

Sun, F.W., et al., "Approaching capacity by equiprobable signaling on the gaussian channel", IEEE Trans. Inf. Theory, vol. 39, No. 5, pp. 1714-1716, 1993.

Van Aardenne-Ehrenfest, T., et al., "Circuits and trees in oriented linear graphs", Simon Stevin : Wis-en Natuurkundig Tijdschrift, 28, 203-217 (1951).

Wozencraft, J., et al., "Principles of Communication Engineering", John Wiley & Sons, Inc., 1965.

* cited by examiner

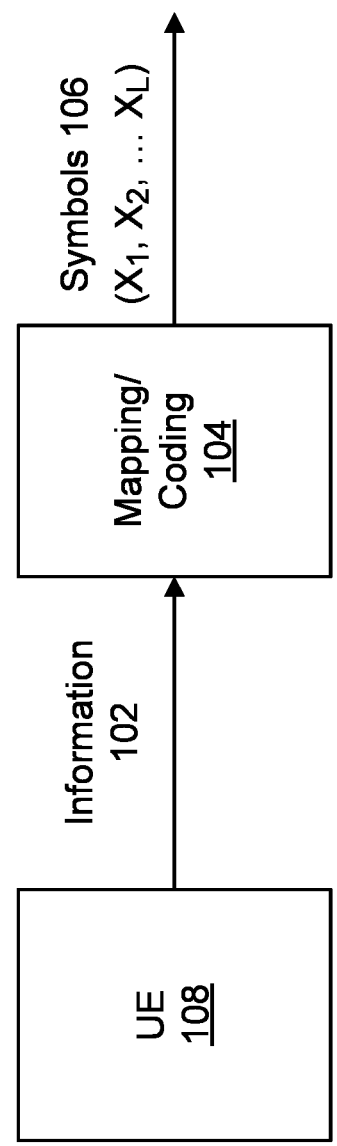

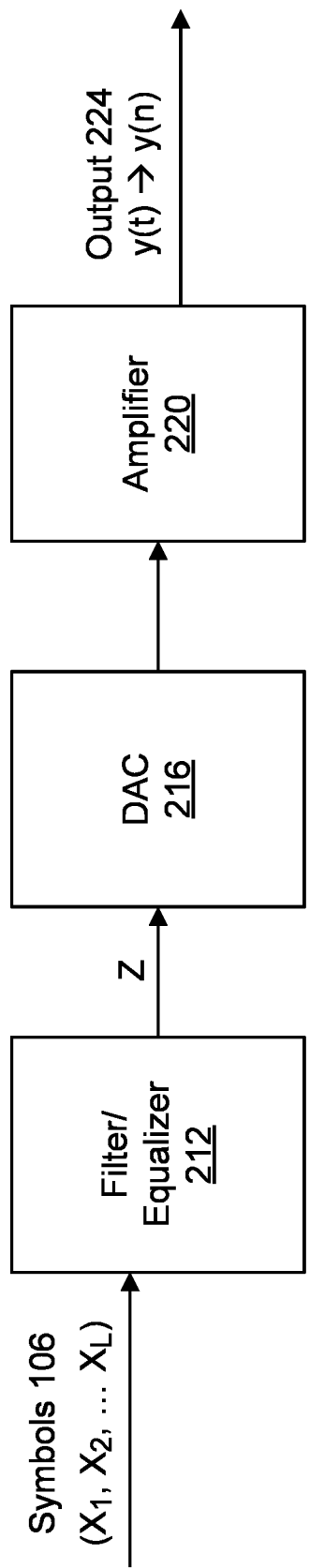

300d

300e

300f

300g

300h

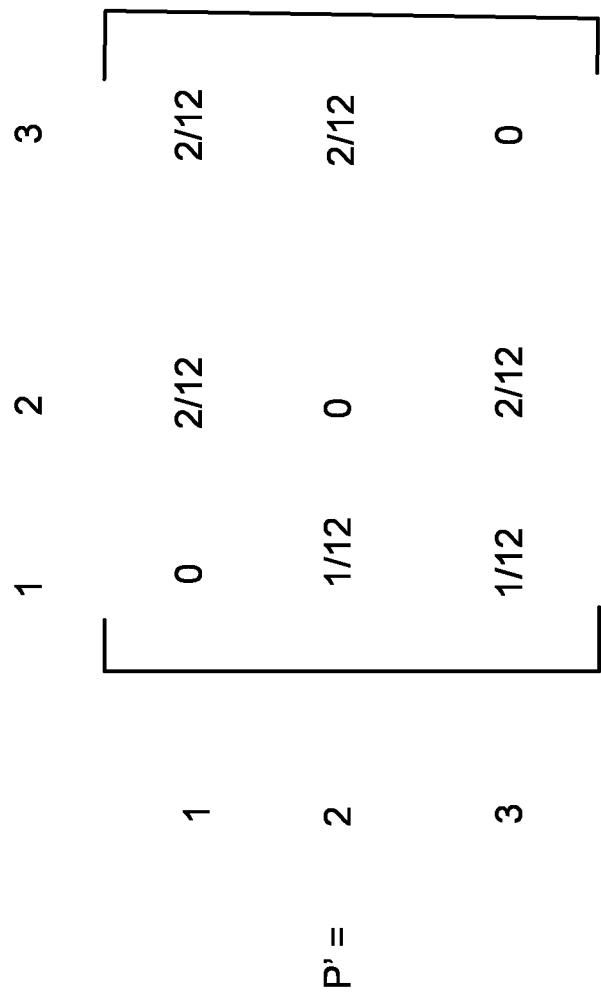

300j

Algorithm 1 CCDM encoder

Require: $k, r, G(V,E), n'e_{v_i \to v_j}, d'(v_j), N_c,$ and $N_c(T_j)$

Find $z$ such that:
$$\sum_{i=1}^{z-1} N_c(T_i) \leq k < \sum_{i=1}^{z} N_c(T_i)$$
$k = k - \sum_{i=1}^{z} N_c(T_i)$
$s_1 = r$
for $n = 1,2,3,...,N$ do
  Find next symbol $s_n+1$:
  For each node $v_j$ connected to $s_n$ via an incoming edge, calculate the number of paths to $r$ using Equation #24 denoted as $N_c(s_n \to v_j)$, if next node is $v_j$. Then find the node which satisfies
$$\sum_{j=1}^{z-1} N_c(s_n \to v_j) \leq k < \sum_{j=1}^{z} N_c(s_n \to v_j)$$
$k = k - \sum_{j=1}^{z-1} N_c(s_n \to v_j) - 1$
$n'e_{s_n \to v_z} = n'e_{s_n \to v_z} - 1$
$d'(s_n) = d'(s_n) - 1$
$s_n+1 = v_z$
end for

*FIG. 3K*

Algorithm 2 CCDM encoder

Require: $k, r, G(V,E), n'e_{v_i \to v_j}, d'(v_i), N_c,$ and $N_c(T_j)$ $k = k / N_c$ Find $z$ such that:
$$\frac{1}{N_c}\sum_{i=1}^{z-1} N_c(T_i) \leq k < \frac{1}{N_c}\sum_{i=1}^{z} N_c(T_i)$$

$l = \frac{1}{N_c}\sum_{i=1}^{z-1} N_c(T_i)$ $u = \frac{1}{N_c}\sum_{i=1}^{z} N_c(T_i)$ $k = (k - l)/(u - l)$ $s_1 = r$ for $n = 1,2,3,...,N$ do Find next symbol $s_n + 1$:

Find node $v_z$ which satisfies:
$$\frac{1}{d'(s_n)}\sum_{j=1}^{z-1} n'e_{v_i \to v_j} \leq k < \frac{1}{d'(s_n)}\sum_{j=1}^{z} n'e_{v_i \to v_j}$$

$l = \frac{1}{d'(s_n)}\sum_{j=1}^{z-1} n'e_{v_i \to v_j}$ $u = \frac{1}{d'(s_n)}\sum_{j=1}^{z} n'e_{v_i \to v_j}$ $k = (k - l)/(u - l)$ $n'e_{s_n \to v_z} = n'e_{s_n \to v_z} - 1$ $d'(s_n) = d'(s_n) - 1$ $s_n + 1 = v_z$ end for

FIG. 3L

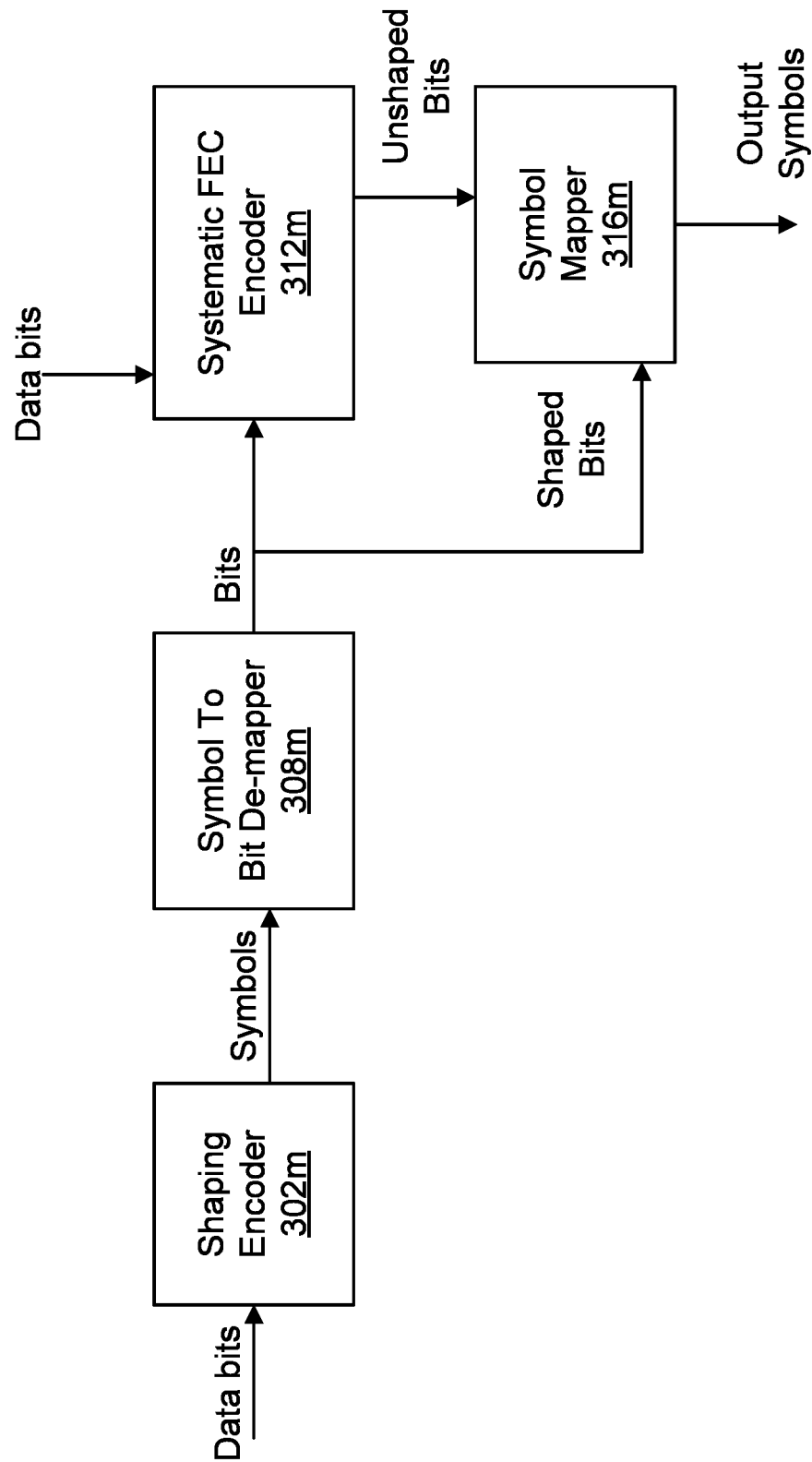

APPARATUSES AND METHODS FOR FACILITATING JOINT PRECODING AND PROBABILISTIC CONSTELLATION SHAPING

FIELD OF THE DISCLOSURE

The subject disclosure relates to apparatuses and methods for facilitating joint precoding and probabilistic constellation shaping.

BACKGROUND

As the world increasingly becomes connected via vast communication networks and systems, and via various communication devices, additional opportunities are generated to provision communication services. The design and implementation of many modern communication networks and systems are subjected to various criteria or constraints that impose challenges. For example, on the one hand there may be a desire to enhance (e.g., maximize) an amount of information that is conveyed via a communication channel or link with a given capacity. On the other hand, there may be a desire to reduce (e.g., minimize) an amount of power that is utilized to transmit the information.

Many studies have been performed that have sought to achieve the capacity of a white Gaussian noise (AWGN) channel when combined with a channel coding algorithm. For example, studies have focused on a design and implementation of channel coding featuring discrete constellation schemes, where such schemes may generally fall into three main groups: geometric constellation shaping (GCS), probabilistic constellation shaping (PCS), and a hybrid approach of GCS and PCS. In GCS schemes, the Gaussian signal distribution may be approximated by constructing constellations with non-uniform spacing while maintaining equal probabilities. In PCS schemes, a non-uniform distribution may be applied to constellation points while keeping a Euclidean distance (e.g., a minimum Euclidean distance) constant. While GCS, PCS, and hybrid approaches featuring GCS and PCS may achieve efficiency gains in theory, standing alone they are insufficient to optimize the efficiency of a practical, non-ideal communication channel or link.

BRIEF DESCRIPTION OF THE DRAWINGS

Reference will now be made to the accompanying drawings, which are not necessarily drawn to scale, and wherein:

FIG. 1 is a block diagram illustrating an example, non-limiting embodiment of a system for generating symbols based on information in accordance with various aspects described herein.

FIG. 2 is a block diagram illustrating a generation of an output for transmission based on the symbols of FIG. 1.

FIG. 3I depicts a matrix that is a counterpart to the matrix of FIG. 3D, and is based on the tree of FIG. 3F, in accordance with aspects of this disclosure.

FIGS. 3K-3L depict algorithms for obtaining a sequence of symbols in accordance with aspects of this disclosure.

FIG. 3M depicts an illustrative system for obtaining one or more output symbols for transmission based on input data/data bits in accordance with aspects of this disclosure.

DETAILED DESCRIPTION

Figure 3A:
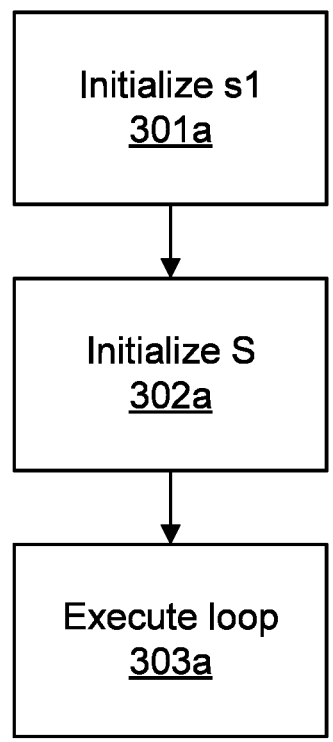
FIGS. 3A-3B depict illustrative embodiments of methods for implementing a constant composition distribution matching (CCDM) algorithm in accordance with various aspects described herein.

The subject disclosure describes, among other things, illustrative embodiments for satisfying objective functions or criteria in a conveyance of data or information where inter-symbol dependencies are introduced based on a user of filtering functions. Other embodiments are set forth herein.

One or more aspects of the subject disclosure may include, in whole or in part, identifying a modulation scheme for transmitting data from a transmitter to a receiver; identifying a plurality of symbols associated with the modulation scheme; determining that a transfer function of a filter that is applied at the transmitter imposes an interdependence amongst at least two symbols of the plurality of symbols; determining, based on the transfer function, a joint probability distribution of the plurality of symbols that reduces (e.g., minimizes) a signal power of at least one signal that is used to transmit the data subject to a constraint that an information rate associated with the at least one signal is greater than a threshold; and causing the data to be transmitted via the at least one signal from the transmitter to the receiver in accordance with the joint probability distribution.

One or more aspects of the subject disclosure may include, in whole or in part, identifying a plurality of symbols associated with a constellation of symbols; determining that a transfer function associated with a source of information imposes an interdependence amongst symbols of the plurality of symbols; identifying, based on the determining, a joint probability distribution of the plurality of symbols that satisfies an objective function that seeks to reduce a signal power of a signal that is used to convey the information and increase an information rate associated with the information; and causing the information to be transmitted from the source to a destination in accordance with the identifying of the joint probability distribution.

One or more aspects of the subject disclosure may include, in whole or in part, obtaining, by a first processing system including a first processor, information from a plurality of client devices; mapping, by the first processing system, the information to a first plurality of symbols; applying, by the first processing system, a first function to the first plurality of symbols to generate a second plurality of symbols, wherein the first function corresponds to an inversion of a second function associated with a communication channel that couples the first processing system and a second processing system that includes a second processor, and transmitting, by the first processing system, the information to the second processing system in accordance with the second plurality of symbols such that the second processing system is able to recover the information in a lossless manner, wherein the first function imposes an interdependence amongst the symbols of the second plurality of symbols, and wherein the first function is selected such that one of: a signal power of signals that are used to transmit second information to the second processing system is reduced (e.g., minimized) subject to a first constraint that an information rate of the second information is greater than a first threshold, or the information rate is increased (e.g., maximized) subject to a second constraint that the signal power is less than a second threshold, wherein the second information includes the information.

Referring to FIG. 1, a system 100 is shown. The system 100 may be used as part of provisioning one or more communication services. In some embodiments, the system 100 may be included or incorporated as part of one or more networks. The system 100 may be operative in accordance with one or more communication protocols, standards, or the like. In some embodiments, communications in the system 100 may occur over one or more channels, links, or the like, generally referred to hereinafter as a link. A link may be implemented or embodied as a wired/wireline link, a wireless link, or a combination thereof. In some embodiments, a medium may be used as a channel or link for conveying one or more signals, data, information, messages, etc. A medium may correspond to, or include, air (in the case of a wireless transmission), a coaxial cable, an ethernet cable, a telephone line, a power or utility line, a fiber (in the case of an optical signal), etc.

The system 100 is shown as including information 102. The information 102 may be composed of a number of bits (or, analogously, bytes, words, double words, etc.). A mapping or coding component 104 may translate the information 102 into a number 'L' of discrete symbols 106, denoted as $X_1, X_2, \ldots X_L$. The symbols 106 may correspond to a given type or kind of modulation (e.g., pulse amplitude modulation [PAM]). The information 102 may be obtained from one or more devices (e.g., client devices), illustratively represented by a user equipment (UE) 108 in FIG. 1. In some embodiments, the symbols 106 may be subjected to a transmission over a communication link.

In practical applications of the system 100, there may be a desire or need to satisfy objective criteria/functions. For example, it may be the case that, given a fixed set of information 102, there is a desire or need to reduce (e.g., minimize) the average signal power after transmitter equalization, i.e., $E[|Z|^2]$ where E is the expectation operator.

As a variant on the foregoing, it may be assumed that instead of being given a fixed set of information 102, there is instead a constraint that the average signal power is limited to be less than or equal to some threshold ($P_o$), e.g.:

$$E[|Z|^2] \leq P_o \qquad \text{Equation \#1}$$

The objective function may be to enhance (e.g., maximize) the number/amount of information that is accommodated. In either case, it may be desirable or necessary that the function represented by the mapping/coding 104 is invertible, meaning that it should be possible to recover the information 102 from the symbols 106 (preferably, in a lossless manner).

FIG. 1 is a simplification of a system 100 that may be used to transmit symbols (e.g., symbols 106) over a communication channel or link. In actual practice, there may be additional components that may be involved. For example, and with reference to FIG. 2, a system 200 is shown. While shown separately, it is understood that aspects of the system 200 may be combined with aspects of the system 100 of FIG. 1. For example, the symbols 106 of the system 100 may serve as an input to the system 200.

The system 200 may include a filter/equalizer 212, a digital to analog converter (DAC) 216, and an amplifier 220. The collective of the filter 212, the DAC 216, and the amplifier 220 may represent a transfer function (represented as K(z) in terms of the Z-transform) from the inputs represented by the symbols 106 to the output y(t) 224 of the amplifier 220. In this regard, it is noted that each of the filter 212, the DAC 216, and the amplifier 220 may contribute a portion of the overall frequency response K(f); stated differently, each of the filter 212, the DAC 216, and the amplifier 220 may have its own associated/respective function.

The output y(t) 224 (which, in terms of discrete time, may be mapped to or represented as y[n]) may be represented as a convolution of the (discrete time-domain) representation of the symbols 106 (x[n]) and the impulse response (k[n]) associated with the frequency response function K(f), e.g.:

$$y[n] = x[n] * k[n] \qquad \text{Equation \#2}$$

The objective functions described above in respect of the system 100 may be extended to the system 200 depicted in FIG. 2, which is to say that there may be a desire or need to: (A) reduce (e.g., minimize) the average signal power given a set of information, and/or (B) enhance (e.g., maximize) the amount of information accommodated in relation to the output y(t) 224 given a power constraint/limitation.

In practical applications, the impulse response k[n] may be modeled as a low-pass filter (LPF) of the form:

$$k[n] = \delta[n] + \alpha\, \delta[n-1], \qquad \text{Equation \#3}$$

where δ is representative of the Kronecker delta function and α is a scaling factor that is potentially subject to a constraint that $0<\alpha<1$. Of course, different functions may be realized for the impulse response k[n] depending on the nature of the components that are utilized; in this respect, Equation #3 above should be viewed as illustrative as opposed to limiting.

Incorporating the foregoing LPF representation of Equation #3 as part of the time domain representation of the output 224 yields:

$$y[n] = x[n] + \alpha\, x[n-1] \qquad \text{Equation \#4}$$

As the foregoing demonstrates, the output 224 (as represented by y[n] in Equation #4) might not be a function of the input symbols 106 with each of the symbols taken singularly/independently. Instead, there may be an interdependence amongst the input symbols 106 in relation to the output (as represented by the combination or addition of x[n] and the scaled version of x[n−1] in Equation #4). It may be the case that Equation #4 may adhere to principles of a Markov model in terms of a probabilistic distribution, e.g., a probabilistic distribution of the form:

$$P(X_1, X_2, \ldots X_L) = P(X_1) \cdot P(X_2 | X_1) \cdot P(X_3 | X_1, X_2) \cdot \ldots \quad \text{Equation \#5}$$

$$P(X_L | X_1, X_2, \ldots X_{L-1})$$

Assuming that the probabilistic distribution (of Equation #5) adheres to a Gaussian distribution, for a two-tap filter Equation #5 may be rewritten as:

$$P(X_1, X_2, \ldots X_L) = e^{\wedge}\left(-\lambda \sum_{i=1}^{L} x_i^2 + \gamma \sum_{i=1}^{L-1} x_i x_{i+1}\right), \quad \text{Equation \#6}$$

where $\lambda$ and $\gamma$ are representative of scaling factors. As one skilled in the art would appreciate, the portion of Equation #6 beginning with the gamma symbol ($\gamma$) may be representative of the contribution corresponding to the interdependence described above. For completeness, Equation #6 may be generalized to encompass a multi-tap filter with a number 'N' of taps as follows:

$$P(X_1, X_2, \ldots X_L) = e^{\wedge}\left(-\lambda \sum_{i=1}^{L} x_i^2 + \sum_{j=1}^{N} \gamma_j \sum_{i=1}^{L-1} x_i x_{i+j}\right) \quad \text{Equation \#7}$$

Thus, in terms of the objective criteria/functions described above, the task may be reformulated/recast as desiring or needing to achieve the objective functions subject to the probability distribution represented by, e.g., Equation #7.

The contribution of the interdependence described above may be conceptualized as including a generation of a hyper-ellipsoid of the form:

$$|x_1|^2 + |x_2|^2 + \mu x_1 x_2, \quad \text{Equation \#8}$$

where $\mu$ is representative of a scaling factor and the term $\mu x_1 x_2$ represents the amount of extent of departure relative to a circle or sphere (where the circle or sphere might otherwise be represented by $|x_1|^2 + |x_2|^2$ if, for example, $\mu$ was set equal to zero).

To adequately provide for shaping given the interdependencies described above, the entropy (H) of a non-independent and identically distributed source with a memory of one may be considered as having the form:

$$\mathbb{H}(a_m | a_{m-1}) = -\sum_{a_{m-1}} \sum_{a_m} P(a_{m-1}, a_m) \log P(a_m | a_{m-1}), \quad \text{Equation \#9}$$

where $H(a_m | a_{m-1})$ is the conditional entropy function, symbols $a_m-1$ and $a_m$ are representative of consecutive/adjacent symbols taken from a set A of L symbols, e.g., $[a_{m-L+1}, \ldots a_m]$, and the function $P(a_m | a_{m-1})$ is representative of a conditional probability.

Armed with Equation #9, the objective functions that may be desired or needed (for a simple scenario where L=2) may be cast as:

$$\underset{P(a_{m-1}, a_m)}{\text{minimize}} \; \mathbb{E}\left[|g^T A(a_{m-1}, a_m)|^2\right] \text{ subject to } \mathbb{H}(a_m | a_{m-1}) \geq R \quad \text{Equation \#10}$$

$$\pi_{a_m} = \pi_{a_{m-1}}, \forall a_{m-1} = a_m \in C$$

where g is representative of a precoding filter (see, e.g., FIG. 2: filter 212) applied at a transmitter with Z-transform $G(z) = 1/H(z)$, $H(z)$ is the Z-transform of the channel impulse response $h_m$, i.e., the transfer function. T represents the transpose operator, the term E [ ] is the expectation operator and $E[|g^T A(a_{m-1}, a_m)|^2]$ represents the pre-coded signal power, the parameter R is representative of a (minimum) data rate that is to be achieved or realized, C is representative of the constellation or constellation mapping (which, in the case of 4-PAM, may be ±1 and ±3), and $\pi_{a_m}$ and $\pi_{a_{m-1}}$ are the marginal probability mass functions (PMFs) of the symbols $a_m$ and $a_{m-1}$, respectively. $\pi_{a_m}$ and $\pi_{a_{m-1}}$ may be obtained as follows:

$$\pi_{a_m} = \sum_{a_{m-1}} P(a_{m-1}, a_m), \quad \text{Equation \#11}$$

$$\pi_{a_{m-1}} = \sum_{a_m} P(a_{m-1}, a_m).$$

where $P(a_m, a_{m-1})$ is the joint PMF of two consecutive symbols. Armed with the foregoing, Equation #10 may be reformulated/recast so as to be expressed as a function of $P(a_{m-1}, a_m)$:

$$\underset{P(a_{m-1}, a_m)}{\text{minimize}} \sum_{a_{m-1}} \sum_{a_m} P(a_{m-1}, a_m) |g^T A(a_{m-1}, a_m)|^2 \quad \text{Equation \#12}$$

$$\text{subject to } \mathbb{H}(a_m | a_{m-1}) = -\sum_{a_{m-1}} \sum_{a_m} P(a_{m-1}, a_m)$$

$$\log \frac{P(a_{m-1}, a_m)}{\sum_{a_m} P(a_{m-1}, a_m)} \geq R$$

$$\sum_{a_{m-1}} P(a_{m-1}, s) = \sum_{a_m} P(s, a_m), \forall s \in C$$

$$\sum_{a_{m-1}} \sum_{a_m} P(a_{m-1}, a_m) = 1$$

$$P(a_{m-1}, a_m) \geq 0, \forall a_{m-1}, a_m \in C.$$

As described above, an assumption was made in generating, e.g., Equation #10 and Equation #12, that L was set to equal to 2. Generalizing Equation #12 for an arbitrary value of L yields:

$$\underset{P(a_{m-L+1}, \ldots, a_m)}{\text{minimize}} \sum_{a_{m-L+1}} \cdots \sum_{a_m} P(a_{m-L+1}, \ldots, a_m) \quad \text{Equation \#13}$$

$$|g^T A(a_{m-L+1}, \ldots, a_m)|^2$$

$$\text{subject to } \mathbb{H}(a_m | a_{m-1}, \ldots, a_{m-L+1}) =$$

$$-\sum_{a_{m-L+1}} \cdots \sum_{a_m} P(a_{m-L+1}, \ldots, a_m) \log$$

$$\frac{P(a_{m-L+1}, \ldots, a_m)}{\sum_{a_{L-1}} P(a_{m-L+1}, \ldots, a_m)} \geq R$$

$$\sum_{a_{m-L+1}} P(a_{m-L+1}, s_1 \ldots, s_{L-1}) =$$

-continued $$\sum_{a_m} P(s_1, \ldots, s_{L-1}, a_m),$$

$$\forall s_1, \ldots, s_{L-1} \in C$$

$$\sum_{a_{m-L+1}} \ldots \sum_{a_m} P(a_{m-L+1}, \ldots, a_m) = 1$$

$$P(a_{m-L+1}, \ldots, a_m) \geq 0,$$

$$\forall a_{m-L+1}, \ldots, a_m \in C$$

It is noted that, based on the foregoing, the objective functions that may be desired or needed (and any constraints that may attach thereto, except for conditional entropy) may be affine functions of $P(a_{m-L+1}, \ldots a_m)$.

To realize an enhanced (e.g., optimized) joint probability $P(a_{m-L+1}, \ldots a_m)$ in respect of the objective function(s), a distribution matching (DM) algorithm (which may be based on PCS techniques) may be used. For example, and as would be appreciated by one of skill in the art, arithmetic coding (AC) is an example of a technique that may be used as part of a DM algorithm to determine/identify/achieve the desired optimized probability $P(a_{m-L+1}, \ldots a_m)$. AC is a sourcing coding technique that may be used for data compression. A principle of AC may entail a partitioning of a unit interval [0, 1) into one or more sub-intervals according to a cumulative mass function (CMF) of a source model. Source symbols may be read sequentially and the interval may be updated after each new/next symbol is read. After all of the symbols have been read, a sub-interval may be calculated. A binary code may be provided to a decoder, where inverse operations may be applied to retrieve the data symbols. Therefore, an AC encoder and decoder can be used as a DM decoder and encoder, respectively.

In some embodiments, constant composition distribution matching (CCDM) may be applied as part of a DM technique. CCDM operates by producing sequences that have a fixed number of occurrences for each amplitude value that satisfies a target composition. Consequently, all the generated sequences have the same energy and are permutations of a base sequence with a specific composition. Somewhat analogously, multiset-partition distribution matching (MPDM), which is an extension of CCDM, relaxes the constraint of identical composition for all sequences. In MPDM, a goal is to have sequences with an ensemble average that achieves a target distribution. This may be accomplished by including sequences with different compositions, such that the desired composition is obtained on average. Compared to CCDM, MPDM may offer a reduction in sequence size needed to obtain a given shaping gain.

Conventional CCDM techniques may be modified to achieve a target number of occurrence for any pairs of consecutive symbols $(s_n, s_{n+1})$ corresponding to PAM symbols. It may be assumed that it is desired to generate an output PAM sequence of length N $(s_1, s_2, \ldots s_N)$ and with an initial value $s_1=1$ such that for each pair of PAM indices (i, j) exactly P(i, j) occurrences are present of such a pair within all N−1 pairs $(s_n, s_{n+1})$. In other words, it may be assumed that:

$$|\{(s_n, s_{n+1})|(s_n, s_{n+1}) = (i, j)\}| = P(i, j) \quad \text{Equation \#14}$$

In this respect, it is noted that P(i, j) may be a K×K matrix, where K denotes the number of PAM levels that are utilized. It is expected that:

$$\sum_{i=1}^{K}\sum_{j=1}^{K} P(i, j) = N - 1 \quad \text{Equation \#15}$$

Thus, in the case of 4-PAM, K=4 and indices 1, 2, 3, and 4 map to levels −3, −1, 1, and 3.

The number of potential sequences of length L may be denoted starting from a value t and with a P(i, j) occurrence as Q(L, t, P), where P may be a K×K matrix as set forth above.

The I bits of information coming from an encoder (or from any other client or device) may be translated into a very large number S. For example, the relationship may adhere to the condition that $0 \leq S \leq 2^I - 1$. Furthermore, a condition of $2^I \leq Q(N, 1, P)$ may be imposed to ensure invertibility.

A goal of the foregoing may be to encode S to a unique sequence $(s_1, s_2, \ldots, s_N)$, where $s_1=1$ and:

Equation #16

$$\forall i, j | 1 \leq i, j \leq K: |\{k | 1 \leq k \leq N-1, (s_k, s_{k+1}) = (i, j)\}| = P(i, j)$$

In order to generate the sequence S set forth immediately above, reference may be made to FIG. 3A, which illustrates a flowchart of a method 300a corresponding to an iterative encoding algorithm. Operations of the method 300a are described below in relation to the blocks shown in FIG. 3A.

In block 301a, s1 may be initialize to a value of 1.

In block 302a, S may be initialized with the I-bit encoder/client information bits.

Figure 3B:
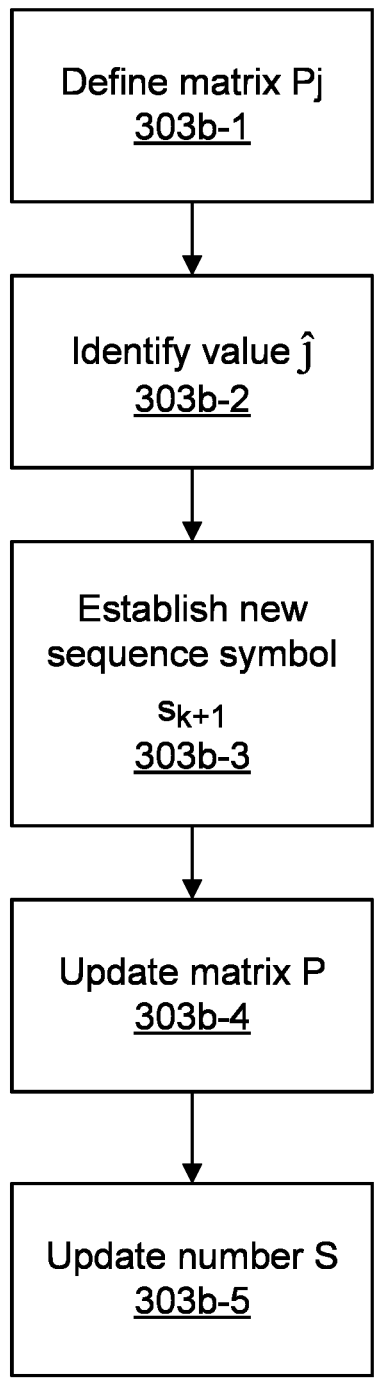

In block 303a, a loop (e.g., a "for" loop) may be executed for k=1 to k=N−1. A number of steps or sub-operations encompassed within block 303a are represented in FIG. 3B.

In block 303b-1, and for each j=1:K, the matrix $P_j$ may be defined as: (i) $P_j:=P$, (ii) $P_j(s_k, j):=P(s_k, j)-1$. It may be assumed that $s_{k+1}=j$, i.e., the PAM symbol index j is transmitted for the k+1$^{th}$ output.

In block 303b-2, the smallest value of $\hat{j}$ may be identified, where $1 \leq \hat{j} \leq K$ such that:

$$\sum_{j=1}^{\hat{j}} Q(N-k+1, j, P_j) \geq S$$

In block 303b-3, a new sequence symbol value may be generated or established as:

$$s_{k+1} := \hat{j}$$

In block 303b-4, the matrix P may be updated as:

$$P := P_{\hat{j}}$$

In block 303b-5, S may be updated as:

$$S := S - \sum_{j=1}^{\hat{j}-1} Q(N-K+1, j, P_j)$$

It is noted that in order to calculate Q(L, s, P), dynamic programming may be utilized to calculate Q recursively as:

$$Q(L, s, P) := \sum_{j=1}^{K} Q(L-1, j, P_j)$$

where $P_j$:=P for almost all entries other than (s, j) for which $P_j(s, j)$:=P(s, j)−1.

Aspects of this disclosure may be implemented in connection with sphere shaping (SpSh). SpSh, which may be included as part of PCS techniques, may include enumerative sphere shaping (ESS) and shell mapping (SM). In ESS, amplitude sequences that satisfy a maximum total energy constraint may be selected for use. In SM, a divide-and-conquer approach may be utilized to find a mapping between indices and amplitude sequences. This may be achieved by breaking an n-dimensional indexing problem into two n/2-dimensional mappings, where the number of steps is equal to $\log_2 n$.

Figure 3C:
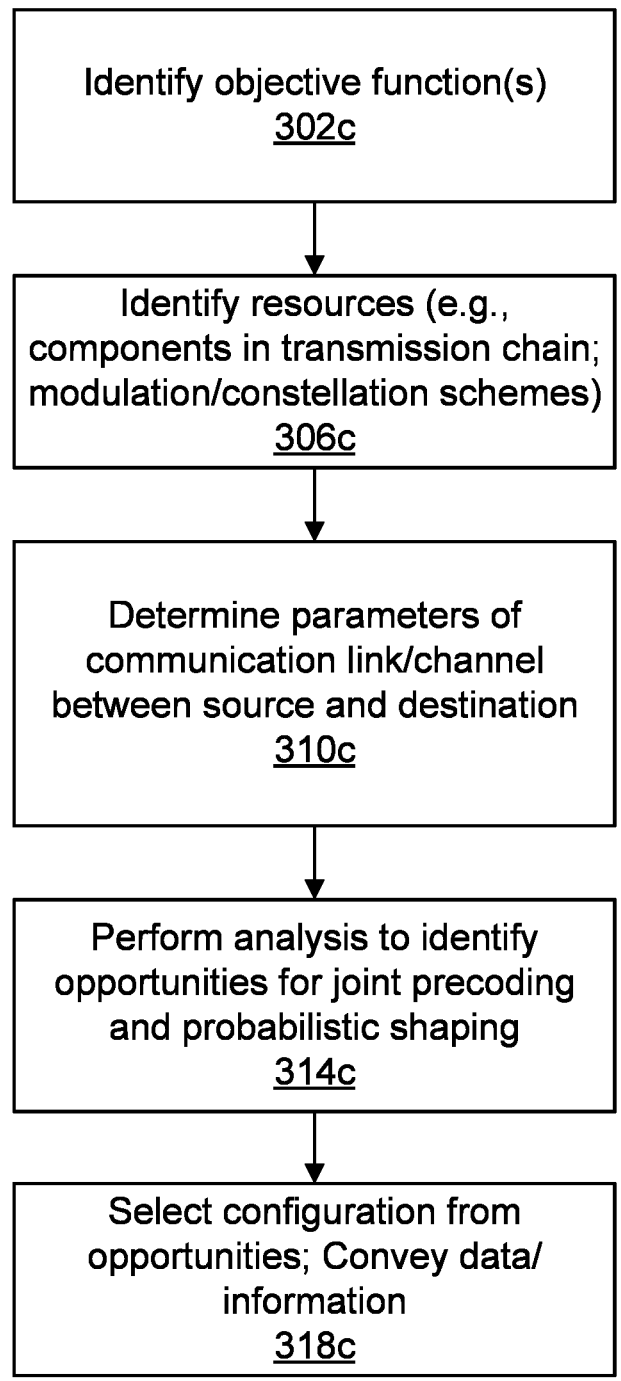
FIG. 3C depicts an illustrative embodiment of a method for facilitating joint precoding and probabilistic constellation shaping in accordance with various aspects of this disclosure.

Referring now to FIG. 3C, a method 300c is shown. The method 300c may be implemented or executed, in whole or in part, in conjunction with one or more systems, devices, and/or components, such as for example the systems, devices, and components set forth herein. While shown separately, in some embodiments one or more aspects of the method 300c may be implemented or executed in conjunction with one or more aspects of the method 300a of FIG. 3A. Various operations of the method 300c are described below in relation to the blocks shown in FIG. 3C.

In block 302c, a determination or identification may be obtained or acquired regarding one or more objective functions that is/are to be realized. For example, block 302c may include a determination or identification of a desire or need to achieve: (A) a reduction (e.g., a minimization) of an average signal power given a set of information that is to be conveyed, or (B) an enhancement (e.g., a maximization) of an amount of information that is to be conveyed (potentially expressed as a throughput or data rate) as part of one or more communication channels or links given a power constraint/limitation. In some embodiments, a hybrid approach may be utilized in respect of block 302c, which is to say that a balance may be struck between reducing average signal power on the one hand and increasing/enhancing the amount of information that is conveyed on the other hand.

In block 306c, a determination or identification of available resources (e.g., hardware, software, firmware, etc.) may be obtained to support the conveyance of the data or information of block 302c. For example, and briefly referring to FIGS. 1-2, an identification of the types or capabilities of the components 104, 212, 216, and 220 may be obtained as part of block 306c. The determination/identification of the types/capabilities of the components in block 306c may serve to establish practical bounds or limits on the possibilities that may be realized in actual practice. Block 306c may include a determination or identification of one or more modulation schemes (or, analogously, constellation schemes or options) that may be available for use in a given environment or context.

In block 310c, parameters associated with a communication channel or link between a source (e.g., a transmitter) and a destination (e.g., a receiver) may be identified or determined. The determination/identification of block 310c may be based on experiments, an analysis of measured data in actual use cases/scenarios, simulations, or any combination thereof. The parameters may be representative of a transformation that is anticipated to be applied to a signal (or, analogously, message) that conveys data or information as the signal traverses the communication channel/link. For example, the transformation may correspond to a transfer function, which may be expressed in one or more forms/formats (e.g., as an impulse response in the discrete time domain, as a frequency domain transformation, etc.).

In block 314c, an analysis may be undertaken based on one or more of blocks 302c, 306c, and 310c, to identify opportunities for providing/realizing joint precoding and probabilistic constellation shaping in respect of the data/information that is to be conveyed from the source to the destination. For example, the operations of block 314c may seek to realize the objective function(s) of block 302c subject to the conditions or parameters associated with the resources/modulation schemes identified in block 306c and/or the communication channel/link parameters identified in block 310c. The block 314c may include an exercise in optimization to adhere to one or more equations or constraints, such as Equations #10, #12, and/or #13 set forth above.

Block 318c may include a conveyance/transmission of the data/information in accordance with a precoding and constellation shaping configuration selected from the identified opportunities of block 314c. The conveyance/transmission of the data may occur via a use of one or more signals, messages, or the like.

As described above, DM algorithms may be used to realize enhanced (e.g., optimized) joint probabilities. In some embodiments, graph theory may serve as a basis of one or more DM algorithms as described in further detail below. By way of introduction, and as one of skill in the art will appreciate, a Eulerian path may be a path on a directed or undirected graph where each edge is passed exactly once. A Eulerian cycle may be a Eulerian path where the corresponding trail ends on a same vertex as a start of the path. A directed graph may have a Eulerian cycle if, and only if, the directed graph is connected and all of the vertices have the same in-degree and out-degree, i.e., the number of edges entering a vertex is the same as the number of edge exiting/leaving the vertex.

Figure 3D:
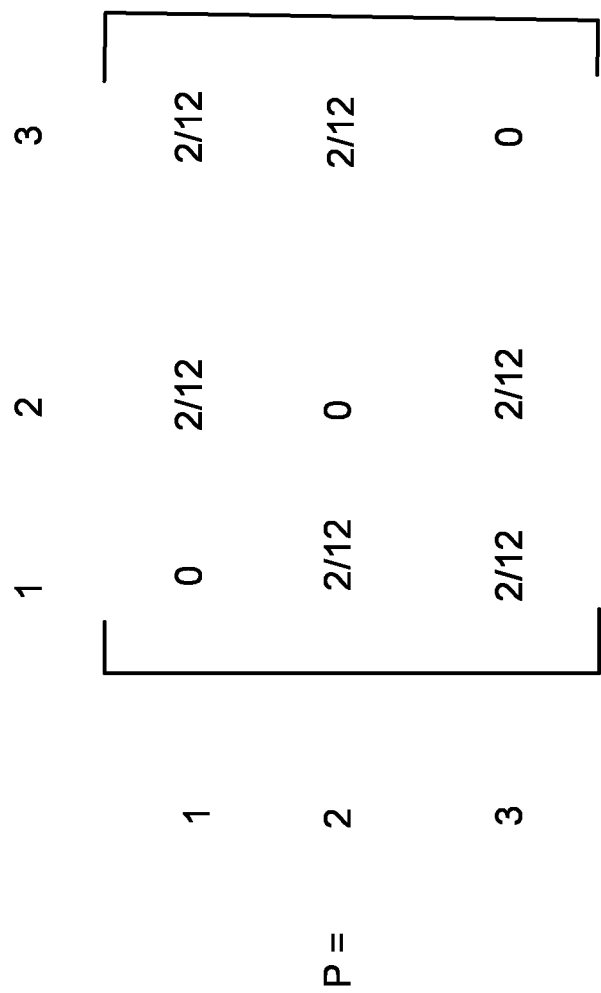
FIG. 3D depicts an illustrative matrix corresponding to probabilities in terms of symbol transitions in accordance with aspects of this disclosure.
Figure 3E:
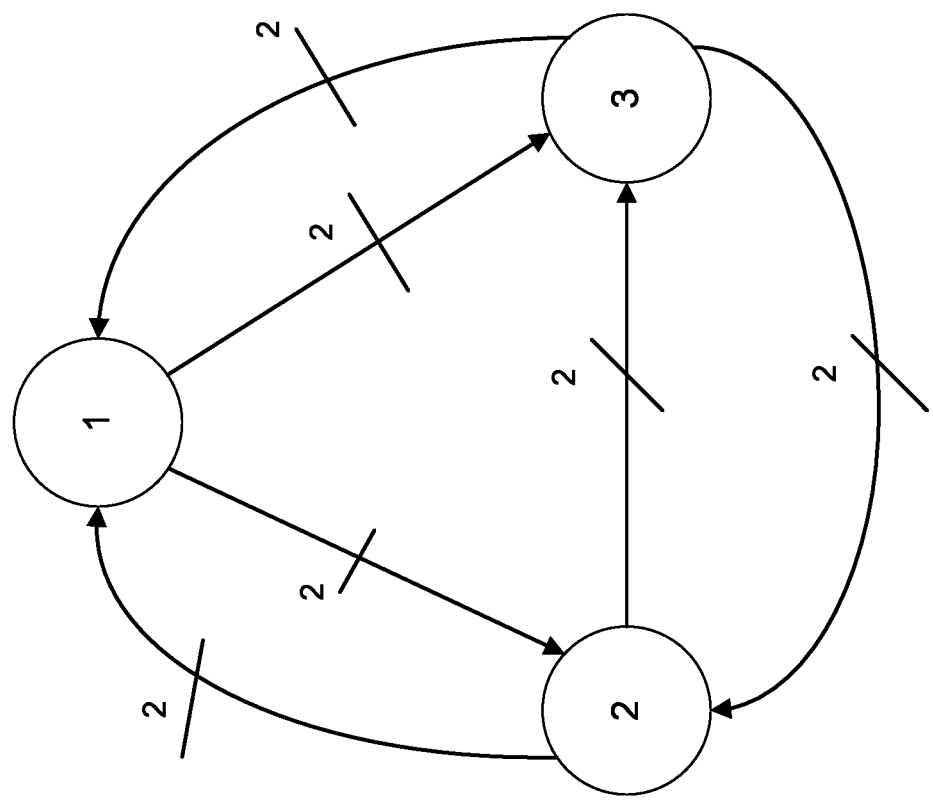
FIG. 3E depicts a graph corresponding to the matrix of FIG. 3D.

To illustrate aspects of the foregoing, reference may be made to FIG. 3D (and the probability matrix 300d that is shown) and FIG. 3E (and the directed graph 300e that is shown). As part of the matrix 300d, it may be assumed that there are potentially three symbols that may be used/selected at a given time instant (e.g., time 'n'), represented as symbols 1, 2, and 3 along the vertical/left-side axis of the matrix 300d. Thereafter, (e.g., at a time instant 'n+1' that is subsequent to the time 'n'), a given one of the symbols 1, 2, or 3 may be used/selected as represented along the horizontal/top axis of the matrix 300d. The values contained within the (brackets of the) matrix 300d may represent the probabilities of transitioning from a given symbol at time 'n' to another symbol at time 'n+1'. For example, the probability of incurring/utilizing the symbol 1 at time 'n' and the symbol 1 at time 'n+1' is shown as being equal to 0. The probability of incurring/utilizing the symbol 1 at time 'n' and the symbol 2 at time 'n+1' is shown in the matrix 300d as being equal to two-divided-by-twelve (2/12). Other values are shown in FIG. 3D. One skilled in the art will appreciate that the values shown in FIG. 3D are illustrative, which is to say that other values may be used without departing from the scope and spirit of this disclosure. It is noted that the summation of the values shown in FIG. 3D is equal to one (1), which is consistent with all potential symbol transitions being accounted for.

The graph 300e is consistent with, or representative of, the matrix 300d. For example, the symbols 1, 2, and 3 of the matrix 300d are represented as nodes/vertices in the graph 300e. The values of the transition probabilities of the matrix 300d have been interposed as weights along the arrows/edges of the graph 300e (in this regard, the denominator of the values of the transition probabilities of the matrix 300d have been removed/discarded in generating/constructing the graph 300e).

As one of skill in the art will appreciate, the so-called BEST algorithm proposes a formula for calculating the number of Eulerian cycles on a directed graph, such as, for example, the graph 300e. To generalize, it may be assumed that G=(V, E) denotes a directed graph with vertices V and edges E that satisfy the requirements for the existence of Eulerian cycles. The number ($N_c$) of Eulerian cycles may be represented as:

$$N_c = t_r(G)d_r \prod_{v_i \in V}(d(v_i)-1)! \qquad \text{Equation \#17}$$

where $d(v_r)$ is the degree of vertex $v_i$ and $t_r(G)$ is the number of spanning trees of G, where the root is vertex r and all the vertices have a directed path towards the root. In an Eulerian graph, the number $N_c$ given by Equation #17 may be the same for all vertices.

Figure 3F:
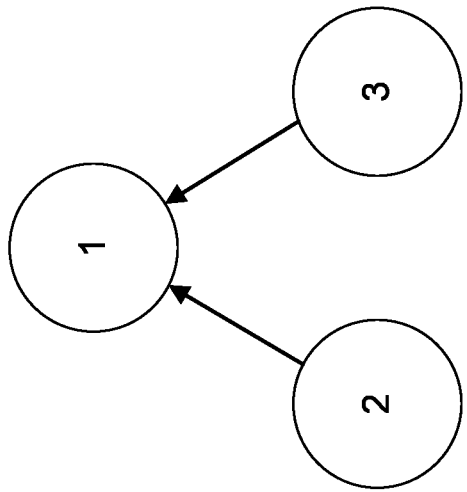
FIGS. 3F-3H depict trees corresponding to the graph of FIG. 3E in accordance with aspects of this disclosure.
Figure 3G:
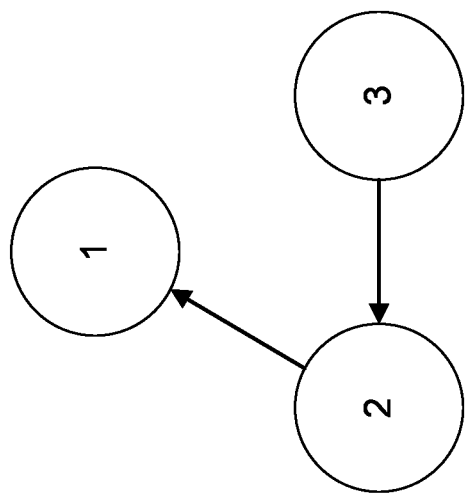
Figure 3H:
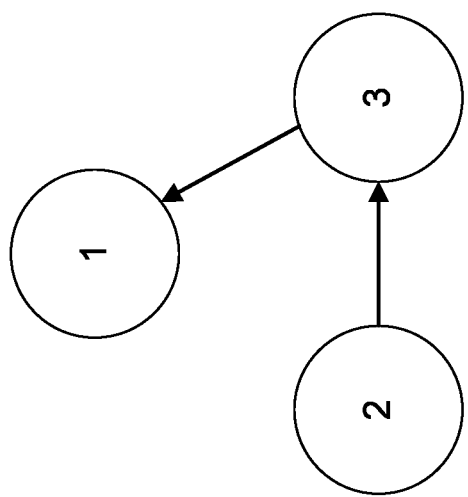

To demonstrate aspects of the foregoing, reference may be made to FIG. 3F, FIG. 3G, and FIG. 3H, which depict three spanning trees (e.g., spanning tree 300f, spanning tree 300g, and spanning tree 300h) corresponding to the graph 300e of FIG. 3E.

It is noted that Equation #17 includes an additional term—namely, $d_r$—in comparison to how Equation #17 might otherwise be represented conventionally. The reason for this additional term is that, conventionally, shifts of a given cycle are not considered. In contrast, and in accordance with aspects of this disclosure, a distinction may be made between a first cycle a→b→a→c→a on the one hand and a second cycle a→c→a→b→a on the other hand, where the node a is the root.

There may be multiple approaches that may be utilized to calculate $t_r(G)$ set forth above. One such technique may be based on forming the Laplacian matrix Q. For example, the elements of Q may be computed as:

$$Q_{i,j} = \begin{cases} d(v_i) & \text{if } i = j \\ -1 & \text{if } i \neq j \text{ and } v_i \text{ is adjacent to } v_j \\ 0 & \text{otherwise,} \end{cases} \qquad \text{Equation \#18}$$

The number $t_r(G)$ may be computed as the determinant of a submatrix Q*, which may be formed by removing any one row and any one column of the matrix Q.

Aspects of the foregoing may be extended to graphs with multiple/parallel edges between vertices, such as, for example, the graph 300e of FIG. 3E. In such graphs, the ordering of the edges from a vertex $v_i$ to a vertex $v_j$ used in a Eulerian cycle might not be important, and different permutations might not be counted separately. In this respect, $n_{e_{vi \to vj}}$ may be used to denote the number of directed parallel edges from vertex $v_i$ to vertex $v_j$. There may be a number of permutations equal to $n_{e_{vi \to vj}}!$ (where the exclamation mark represents the factorial mathematical operator/operation). Therefore, the total number of Eulerian cycles starting from vertex r may be computed as:

$$N_c = t_r(G)d(r)\frac{\prod_{v_i \in V}(d(v_i)-1)!}{\prod_{e_{v_j \to v_j} \in E} n_{e_{v_j \to v_j}}!} \qquad \text{Equation \#19}$$

The number of Eulerian cycles for a given spanning tree T with node r as the root may also be computed. The tree may connect each vertex on the graph to root r by exactly one path. The edges on the spanning tree may be the last exit from any node. At each vertex, there may be $d(v_i)-1$ ways to order the outgoings, except for the root where there may be $d_r!$ permutations. However, consideration may be given to the parallel edges, which might only be counted once. The parallel edges on the tree may have/contribute $(e_{vi \to vj}-1)!$ permutations, while non-tree edges may have/contribute $(e_{vi \to vj})!$ permutations. Thus, the total number of Eulerian cycles for a given tree may be given by Equation #20 or Equation #21 as follows:

$$N_c(T) = d_r \frac{\prod_{v_i \in V}(d(v_i)-1)!}{\prod_{e_{v_i \to v_j} \notin T} n_{e_{v_i \to v_j}}! \prod_{e_{v_i \to v_j} \in T}(n_{e_{v_i \to v_j}}-1)!} \qquad \text{Equation \#20}$$

$$= d_r \frac{\prod_{v_i \in V}(d(v_i)-1)!}{\prod_{e_{v_i \to v_j} \in E} n_{e_{v_i \to v_j}}!} \prod_{e_{v_i \to v_j} \in T} n_{e_{v_i \to v_j}} \qquad \text{Equation \#21}$$

For notational simplicity, parameters $d'(v_i)$ and $n'_{e_{vi \to vj}}$ may be defined in Equation #22 and Equation #23 as follows:

$$d'(v_i) = \begin{cases} d(v_i) & \text{if } i = r \\ d(v_i)-1 & \text{otherwise,} \end{cases} \qquad \text{Equation \#22}$$

$$n'_{e_{v_i \to v_j}} = \begin{cases} n_{e_{v_i \to v_j}} & \text{if } e_{v_i \to v_j} \notin T \\ n_{e_{v_i \to v_j}}-1 & \text{if } e_{v_i \to v_j} \in T \end{cases}. \qquad \text{Equation \#23}$$

Armed with, or utilizing, the parameters defined by Equation #22 and Equation #23 above, the number of Eulerian cycles $N_c(T)$ may be rewritten or expressed as:

$$N_c(T) = \frac{\prod_{v_i \in V} d'(v_i)!}{\prod_{e_{v_i \to v_j} \in E} n'_{e_{v_i \to v_j}}!} \qquad \text{Equation \#24}$$

To illustrate aspects of the foregoing, and with reference to FIG. 3I (as well as FIGS. 3D, 3E, and 3F), a matrix 300i (corresponding to a counterpart of the matrix 300d) is shown with probabilities/probability values P' corresponding to the tree 300f. Relative to the values shown in FIG. 3D, in FIG. 3I the values corresponding to the symbol transitions 2→1 and 3→1 from time 'n' to time 'n+1' have been reduced from 2/12 to 1/12, corresponding to the edges/branches of the tree 300f. Similarly, the graph 300j shown in FIG. 3J (which corresponds to the matrix 300i, and is a counterpart to the graph 300e) has the values of the edges corresponding to the symbol transitions 2→1 and 3→1 reduced from 2 to 1 (relative to what is shown in the graph 300e). One will appreciate that matrices similar to that shown in FIG. 3I could be constructed for the trees 300g and 300h.

Figure 3J:
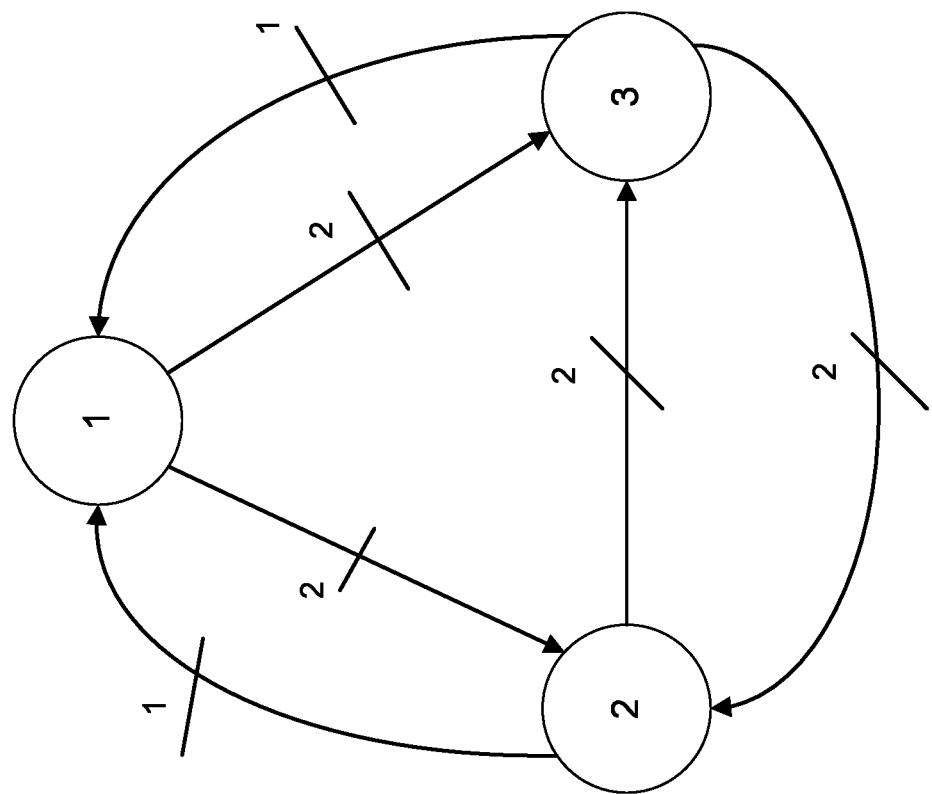
FIG. 3J depicts a graph corresponding to the matrix of FIG. 3I.

Given the values shown in, e.g., FIG. 3J, the number of paths may be computed as:

$$[4!/(2!\,2!)] * [(2+1)!/(2!\,1!)] * [(2+1)!/(2!\,1!)],$$

where the symbol * represents multiplication.

With the foregoing description serving as a basic foundation in graph theory, consideration may be given to mapping a stream of $R_N$ bits to a sequence of N symbols. As part of such a mapping, it may be necessary to find a unique one-to-one mapping between an integer index k (where $0 \le k \le 2^{R_N}-1$) and a sequence. It may be assumed that $N_c \ge 2^{R_N}$; therefore, the number of sequences may be large enough to represent all of the indices. Further, it may be assumed that the enhanced (e.g., optimized) joint probabilities are quantized to integer values for a sequence of length N. A matrix adhering to the foregoing may represent the number of edges between every two vertices, i.e., $n_{e_{vi \to vj}}$, and the vertices may be the symbols.

Without loss of generality, a starting vertex may be fixed to r and the number of spanning trees $N_T$ and the number of Eulerian cycles $N_c(T_i)$ may be calculated. Then, the index k may be used to determine which spanning tree should be used for path selection. Thus, a search/selection may be made to identify a spanning tree $T_z$ that satisfies Equation #25 as follows:

$$\sum_{i=1}^{z-1} N_c(T_i) \le k < \sum_{i=1}^{z} N_c(T_i) \qquad \text{Equation \#25}$$

After the tree is selected in accordance with Equation #25, movement from the node r may be undertaken and a sequence may be formed corresponding to the index k. At each vertex, the number of paths to r may be computed for each connecting node. Then, the next vertex may be chosen/selected based on the index k. The output sequence may be denoted by $s_1, s_2, \ldots, s_N$. With reference to FIG. 3K and FIG. 3L, algorithms (labeled Algorithm 1 and Algorithm 2, respectively) for computing the output sequence $s_1, s_2, \ldots, s_N$ via an encoder (e.g., a CCDM encoder) are shown. Relative to the Algorithm 1 of FIG. 3K, the Algorithm 2 of FIG. 3L may be simpler or easier to implement, and may be derived by normalizing the index k to the range [0, 1).

In terms of the Algorithms 1-2 of FIGS. 3K-3L, an ordering may be required when choosing nodes along a path. One possible approach may be to lexicographically order the symbols. A decoder may apply an inverse of operations of the encoder, i.e., an index may be calculated for the received sequence of symbols. In some embodiments, the Algorithms 1-2 may be improved (e.g., optimized) to reduce the computational complexity of the number of path calculations. Further, in some instances approximations may be made to facilitate further simplifications. In this respect, the Algorithms 1-2 should be viewed as being illustrative, as opposed to limiting, as variations are well within the scope and spirit of this disclosure.

With reference to FIG. 3M, a system 300m is shown that may be used to implement aspects of the foregoing. For example, the system 300m may include a shaping encoder 302m that may generate (a sequence of) symbols based on incoming/input data bits, where the encoder 302m may be operative in accordance with, e.g., Algorithm 1 of FIG. 3K or Algorithm 2 of FIG. 3L.

Figure 3N:
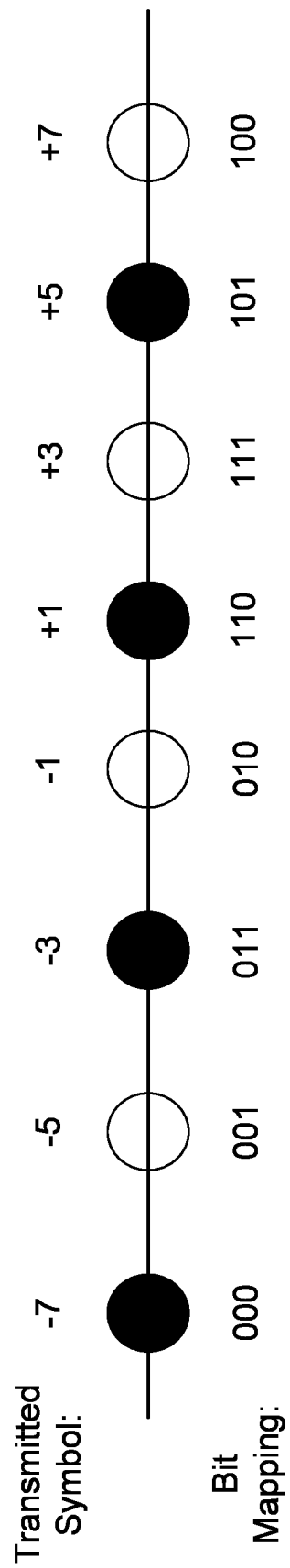
FIG. 3N depicts a relationship between bit mapping and shaped signaling in accordance with aspects of this disclosure.

Utilizing a conventional or classical shaping technique, only the magnitudes of symbols are shaped, i.e., shaped bits are used to select the magnitude of symbols. Unshaped, balanced bits are used to choose the sign of the constellation point, which does not impact the overall shaping that is obtained as the distribution of symbols is assumed to be symmetric with respect to the origin. In contrast, and in accordance with aspects of this disclosure, such an assumption might not necessarily be warranted or proper, as the enhanced (e.g., optimized) probabilities might not be symmetric around in the origin in general. Thus, in accordance with aspects of this disclosure, unshaped bits may be used to select adjacent constellation points, as they (are likely to) have the closest probabilities. For example, and briefly referring to FIG. 3N, for a shaped 8-ASK modulation with C={±1, ±3, ±5, ±7}, the constellation points C may be divided into four constellation groups of adjacent symbols, i.e., Group 1 {−7, −5}, Group 2 {−3, −1}, Group 3 {+1, +3}, and Group 4 {+5, +7}. The shaped bits may determine the constellation group with different probabilities, and the unshaped bit(s) may be used to select the particular constellation point within the determined constellation group. When enhancing (e.g., optimizing) the probabilities, the average of the constellation points may be selected for each group, i.e., C={±2, ±6}. Taking the foregoing example involving 8-ASK, it is noted that the two most significant bits (MSBs) are grey-coded conditioned on the value of the unshaped least significant bit (LSB). In this respect, and in this example, the bit mapping of FIG. 3N may take the form: (s1, s2, u), where u is an unshaped bit, s1 is a first shaped bit, and s2 is a second shaped bit.

Referring again to FIG. 3M, an overall system architecture for realizing/obtaining constellation shaping and forward error correction (FEC) encoding is provided. As described above, any client data bits that may be obtained may be provided to the shaping encoder 302m. In turn, the shaping encoder 302m may generate/provide shaped symbols. In the example of 8-ASK signaling set forth above, the output of the shaping encoder 302m may correspond to a 4-ASK modulation with C={±2, ±6}. The symbols output by the encoder 302m may be converted by, e.g., a symbol to bit de-mapper 308m back to the bit domain for FEC processing. The systematic FEC encoder 312m may be used to generate balanced parity bits (represented as unshaped bits in FIG. 3M), which may be used to select the constellation point within each shaped group, as described above, and as represented by the output symbols of the symbol mapper 316m. The inverse of the operations performed by the system 300m may be performed/provided at a receiver to retrieve the transmitted information (e.g., to retrieve the data bits).

While for purposes of simplicity of explanation, the respective processes are shown and described as a series of blocks in various ones of the figures of the accompanying drawings, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As set forth above, practical applications of this disclosure provide a (stationary) Markovian model, where transition probabilities of transmit symbols may be enhanced (e.g., optimized) to reduce (e.g., avoid) sequences that have high energy (e.g., energy in an amount greater than a threshold) when convolved with a precoding filter. Aspects of the foregoing may be applied or generalized to a space of any number of dimensions, thereby providing a significant degree/level of flexibility and generating numerous opportunities for improving/enhancing an efficiency of communication networks and systems. Furthermore, aspects of this disclosure may tend to reduce power that is utilized to transmit signals conveying a given amount of information (or, analogously, information bits), which may be useful from a perspective of reducing interference between signals or devices. Stated differently, and for a given power profile/envelope, aspects of this disclosure may be utilized to increase the amount of information or data that is conveyed within a communication network or system. Thus, the various aspects of this disclosure represent substantial improvements to technology.

In view of the foregoing, one of skill in the art will appreciate that the various aspects of this disclosure are not directed to abstract ideas. To the contrary, the various aspects of this disclosure are directed to, and encompass, significantly more than any abstract idea standing alone. The various aspects of this disclosure provide for a generation of useful, concrete, and tangible results. Such results may be obtained/realized based on the transformative algorithms and techniques that have been described above.

Figure 4:
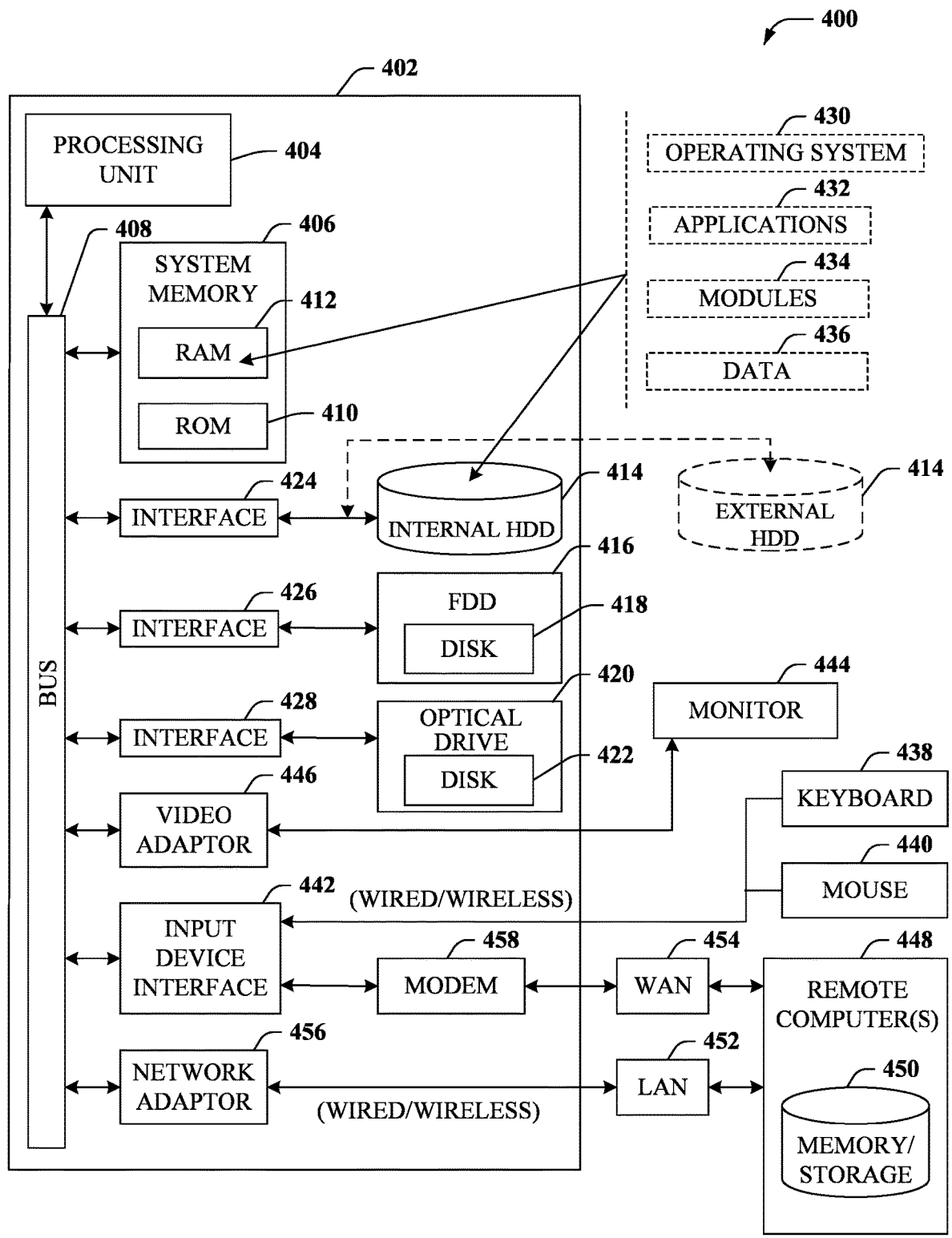
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, the computing environment 400 can be used in a communication device, a node, etc. Each of these devices can be implemented via computer-executable instructions that can run on one or more computers, and/or in combination with other program modules and/or as a combination of hardware and software. For example, the computing environment 400 can facilitate, in whole or in part, identifying a modulation scheme for transmitting data from a transmitter to a receiver, identifying a plurality of symbols associated with the modulation scheme; determining that a transfer function of a filter that is applied at the transmitter imposes an interdependence amongst at least two symbols of the plurality of symbols; determining, based on the transfer function, a joint probability distribution of the plurality of symbols that minimizes a signal power of at least one signal that is used to transmit the data subject to a constraint that an information rate associated with the at least one signal is greater than a threshold; and causing the data to be transmitted via the at least one signal from the transmitter to the receiver in accordance with the joint probability distribution. The computing environment 400 can facilitate, in whole or in part, identifying a plurality of symbols associated with a constellation of symbols; determining that a transfer function associated with a source of information imposes an interdependence amongst symbols of the plurality of symbols; identifying, based on the determining, a joint probability distribution of the plurality of symbols that satisfies an objective function that seeks to reduce a signal power of a signal that is used to convey the information and increase an information rate associated with the information; and causing the information to be transmitted from the source to a destination in accordance with the identifying of the joint probability distribution. The computing environment 400 can facilitate, in whole or in part, obtaining, by a first processing system including a first processor, information from a plurality of client devices; mapping, by the first processing system, the information to a first plurality of symbols; applying, by the first processing system, a first function to the first plurality of symbols to generate a second plurality of symbols, wherein the first function corresponds to an inversion of a second function associated with a communication channel that couples the first processing system and a second processing system that includes a second processor, and transmitting, by the first processing system, the information to the second processing system in accordance with the second plurality of symbols such that the second processing system is able to recover the information in a lossless manner, wherein the first function imposes an interdependence amongst the symbols of the second plurality of symbols, and wherein the first function is selected such that one of: a signal power of signals that are used to transmit second information to the second processing system is minimized subject to a first constraint that an information rate of the second information is greater than a first threshold, or the information rate is maximized subject to a second constraint that the signal power is less than a second threshold, wherein the second information includes the information.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
    a processing system including a processor; and
    memory storing instructions that, when executed by the processing system, facilitate a performance of operations, the operations comprising:
    determining that a transfer function of a filter that is applied at a transmitter imposes an interdependence amongst at least two symbols of a plurality of symbols;
    determining, based on the transfer function, a joint probability distribution of the plurality of symbols that reduces a signal power of at least one signal that is used to transmit data subject to a constraint that an information rate associated with the at least one signal is greater than a threshold; and
    causing the data to be transmitted via the at least one signal from the transmitter to a receiver in accordance with the joint probability distribution.

2. The device of claim 1, wherein the filter comprises an equalizer.

3. The device of claim 1, wherein the operations further comprise:
    identifying a second transfer function associated with a communication medium that is between the transmitter and the receiver; and
    selecting the transfer function for the filter based on the second transfer function.

4. The device of claim 3, wherein a third transfer function associated with the transmitter corresponds to an inversion of the second transfer function, and wherein the transfer function is subsumed within the third transfer function.

5. The device of claim 3, wherein the communication medium includes air, and wherein the at least one signal includes a wireless signal.

6. The device of claim 3, wherein the communication medium includes fiber, and wherein the at least one signal includes an optical signal.

7. The device of claim 3, wherein the operations further comprise:
    identifying a third transfer function associated with a digital to analog converter (DAC) of the transmitter; and
    identifying a fourth transfer function associated with an amplifier of the transmitter,
    wherein the selecting of the transfer function for the filter is further based on the third transfer function and the fourth transfer function.

8. The device of claim 1, wherein the operations further comprise:
    identifying a modulation scheme for transmitting the data from the transmitter to the receiver;
    identifying the plurality of symbols as being associated with the modulation scheme,
    wherein the identifying of the modulation scheme is based on a selection of the modulation scheme from a plurality of modulation schemes.

9. The device of claim 8, wherein the modulation scheme is based on pulse amplitude modulation.

10. The device of claim 1, wherein the plurality of symbols is arranged as a constellation of symbols, and wherein the at least two symbols are adjacent symbols within the constellation.

11. The device of claim 1, wherein the determining that the joint probability distribution of the plurality of symbols that reduces a signal power of at least one signal that is used to transmit the data is further subject to a second constraint that a first marginal probability mass function (PMF) of a first symbol of the at least two symbols is equal to a second marginal PMF of a second symbol of the at least two symbols.

12. The device of claim 1, wherein the determining of the joint probability distribution is based on a use of a distribution matching (DM) algorithm.

13. The device of claim 12, wherein the DM algorithm includes a use of arithmetic coding (AC).

14. The device of claim 12, wherein the DM algorithm includes a use of constant composition distribution matching (CCDM) or multiset-partition distribution matching (MPDM).

15. The device of claim 12, wherein the DM algorithm is based on a use of graph theory, and wherein the operations further comprise:
generating a plurality of shaped bits and at least one unshaped bit based on the plurality of symbols; and
generating a plurality of output symbols based on the plurality of shaped bits and the at least one unshaped bit,
wherein the causing of the data to be transmitted via the at least one signal is based on the plurality of output symbols.

16. The device of claim 1, wherein the determining of the joint probability distribution is based on a use of a probabilistic constellation shaping (PCS) algorithm.

17. The device of claim 16, wherein the PCS algorithm includes a use of enumerative sphere shaping (ESS) or shell mapping (SM).

18. A non-transitory computer-readable storage medium comprising instructions that, when executed by a processing system including a processor, facilitate a performance of operations, the operations comprising:
determining that a transfer function associated with a source of information imposes an interdependence amongst symbols of a plurality of symbols;
identifying, based on the determining, a joint probability distribution of the plurality of symbols that satisfies an objective function that seeks to reduce a signal power of a signal that is used to convey the information and increase an information rate associated with the information; and
causing the information to be transmitted from the source to a destination in accordance with the identifying of the joint probability distribution.

19. The non-transitory computer-readable storage medium of claim 18, wherein the plurality of symbols is associated with a constellation of symbols, and wherein the source obtains first information of the information from a first client device and obtains second information of the information from a second client device.

20. A method comprising:
obtaining, by a first processing system including a first processor, information from a plurality of client devices;
mapping, by the first processing system, the information to a first plurality of symbols;
applying, by the first processing system, a first function to the first plurality of symbols to generate a second plurality of symbols, wherein the first function corresponds to an inversion of a second function associated with a communication channel that couples the first processing system and a second processing system that includes a second processor; and
transmitting, by the first processing system, the information to the second processing system in accordance with the second plurality of symbols such that the second processing system is able to recover the information in a lossless manner,
wherein the first function imposes an interdependence amongst the symbols of the second plurality of symbols, and
wherein the first function is selected such that one of:
a signal power of signals that are used to transmit second information to the second processing system is reduced subject to a first constraint that an information rate of the second information is greater than a first threshold, or
the information rate is increased subject to a second constraint that the signal power is less than a second threshold,
wherein the second information includes the information.

* * * * *